United States Patent [19]

Lee

[11] Patent Number: 5,185,670

[45] Date of Patent: Feb. 9, 1993

[54] ZOOMING POSITION ON-SCREEN DISPLAY DEVICE FOR CAMCORDERS

[75] Inventor: Chang J. Lee, Seoul, Rep. of Korea

[73] Assignee: Gold Star Co., Ltd., Rep. of Korea

[21] Appl. No.: 689,647

[22] Filed: Apr. 23, 1991

[30] Foreign Application Priority Data

Apr. 26, 1990 [KR] Rep. of Korea ............... 5249/1990

[51] Int. Cl.$^5$ ............................................. H04N 5/232
[52] U.S. Cl. ................................. 358/227; 358/209; 358/224
[58] Field of Search ............... 358/227, 226, 225, 224; 354/465, 471, 472, 474, 475, 195.12

[56] References Cited

U.S. PATENT DOCUMENTS

| | | | |
|---|---|---|---|
| 4,446,526 | 5/1984 | Iwanade | 364/525 |
| 4,527,201 | 7/1985 | Cappels | 358/224 |
| 4,589,031 | 5/1986 | Tsuji | 358/227 |
| 4,739,411 | 4/1988 | Bolton | 358/227 |
| 4,855,782 | 8/1989 | Kobayashi et al. | 354/475 |
| 4,963,907 | 10/1990 | Inoue et al. | 354/222 |
| 4,999,713 | 3/1991 | Ueno et al. | 358/225 |
| 5,041,860 | 8/1991 | Kobayashi et al. | 354/465 |

FOREIGN PATENT DOCUMENTS 56-87030 7/1981 Japan.
59-66275 4/1984 Japan.
62-10634 1/1987 Japan.
63-195639 8/1988 Japan.
2-74935 3/1990 Japan.

*Primary Examiner*—Michael T. Razavi
*Assistant Examiner*—Tuan V. Ho
*Attorney, Agent, or Firm*—Ostrolenk, Faber, Gerb & Soffen

[57] ABSTRACT

An on-screen display for a camcorder comprising a zoom motor, a zoom motor gear, a zoom gear, a zoom lens, a microcomputer adapted for outputting switching control output signals, an on-screen display character signal generator adapted for generating on-screen display character signal, a luminance/color processing circuit adapted for outputting composite video signal, a zooming position detector device which comprises a variable resistor and a variable resistor gear, a reference voltage variation unit which comprises a plurality of transistors and a plurality of emitter resistors and a ground resistor, a comparison unit which comprises a comparator having an inversion input terminal and a non-inversion input terminal. The present invention can provide an on-screen display for a camcorder which can prevent the user from missing the important scene and provide good pictures which are prevented from being shaken and out of composition.

4 Claims, 4 Drawing Sheets

FIG.6

| LEVEL | OSD EXAMPLES |
|---|---|
| 1 | ▯ |
| 2 | ▯ ▯ |
| 3 | ▯ ▯ ▯ |
| 4 | ▯ ▯ ▯ ▯ |
| 5 | ▯ ▯ ▯ ▯ ▯ |
| 6 | ▯ ▯ ▯ ▯ ▯ ▯ |
| 7 | ▯ ▯ ▯ ▯ ▯ ▯ ▯ |
| 8 | ▯ ▯ ▯ ▯ ▯ ▯ ▯ ▯ |

ZOOMING POSITION ON-SCREEN DISPLAY DEVICE FOR CAMCORDERS

BACKGROUND OF THE INVENTION

The present invention relates to camcoders, more particularly to an on-screen display for displaying a zooming position of zoom lens in the camcorders on the screen of a CRT (cathode ray tube) in order to quickly and accurately control the zooming operation of zoom lens in the camcorders.

Conventionally, the focusing operation, that is the zooming operation of the zoom lens in camcoders has been carried out by in/out movement of the zoom lens, which zooming operation has been generally controlled by means of zooming controllers.

FIG. 1 is a schematic view showing an example of the conventional zooming controllers for camcorders, which controller comprises a zoom motor 1 adapted to generate normal/reverse driving powers in response to zooming control signals, a zoom motor gear 2 for transmitting the driving power from the motor 1 to a zoom gear 3, and the zoom gear 3 engaged with said zoom motor gear 2 to simultaneously therewith, thereby causing a zoom lens 4 to do in/out movement.

In the conventional zooming controller, the zoom motor 1 rotates in a normal or a reverse direction in response to zooming control signals in order to generate driving power by which the zoom motor gear 2 is driven, then the zoom gear 3 engaged with the zoom motor gear 2 rotates, thereby causing the zoom lens 4 to move in/out.

On the other hand, FIG. 2 is a block diagram showing an operation of a conventional on-screen display (OSD) for the camcorder according to prior art, which conventional on-screen display operates individually with the zooming controller of FIG. 1. The on-screen display of FIG. 2 comprises a microcomputer 5, an on-screen display character signal generator 6, and a luminance/color processing circuit 7. The conventional on-screen display device operates as follows.

Once the microcomputer 5 outputs on-screen display data with a clock at its output ports (P5–P8) in synchronization with a vertical synchronizing signal (Vsync), the on-screen display character signal generator 6 then generates an on-screen display character signal (OSD) in accordance with the on-screen display data from the microcomputer 5 in synchronization with the vertical synchronizing signal (Vsync) and a horizontal synchronizing signal (Hsync), and also the luminance/color processing circuit 7 processes a video signal in accordance with video information obtained from the zoom lens 4 (video in), so that it outputs the vertical synchronizing signal (Vsync) and the horizontal synchronizing signal (Hsync) to the microcomputer 5 and the on-screen display signal generator 6 and then composes the on-screen display character signal (OSD) with the processed video signal to output a composite video signal (video out).

As described above, the conventional camcorder includes the zooming controller and the on-screen display which operate individually with each other without any relationship therebetween, thus it has not any function for supplying the information for the present zooming position. Therefore, the correct information for the present zooming position can not be obtained, and thus focusing of the zoom lens (zooming operation) can not help being roughly accomplished by user's guess. As a result, there is a limit in zooming operation when the object moves quickly in backward or forward direction, and thus the pickup may interrupt. Otherwise, the user has to mvoe quickly with the moving object, but such a moving pickup may result in missing the important scene or obtaining bad pictures of image shaken or out of focus.

SUMMARY OF THE INVENTION

Accordingly, it is an object of the present invention to provide a zooming position on-screen display device for the camcorder which can accurately control the zooming operation of the zoom lens corresponding to the moving object, so that it can detect a correct information for the present zooming position for the moving object and then display the information on-screen.

In accordance with the present invention, the object can be accomplished by providing an on-screen display device for a camcorder comprising a zoom motor, a zoom motor gear, a zoom gear, a zoom lens, a microcomputer adapted for outputting on-screen display data, an on-screen display character signal generator adapted for generating on-screen display character signals in response to the on-screen display data inputted from the microcomputer, and a luminance/color processing circuit for composing the on-screen display character signals inputted from the on-screen display character signal generator with the video signal and then outputting the composite video signals, further comprising: zooming position detect means for detecting the zooming position in voltage signal in proportion to the direction and the number of rotations of said zoom gear; reference voltage variation means for varying in regular sequence and along the preset steps the reference voltage in response to switching control signals from said microcomputer; and comparison means for comparing the variable reference voltage signal from said reference voltage variation means with the zooming position detect voltage signal from said zooming position detector means, varying the output signal level at the step of the variable reference voltage signal corresponding to the zooming position detect voltage signal, and then outputting the on-screen display level setting control signal to said microcomputer.

BRIEF DESCRIPTION OF THE DRAWINGS

The above and other objects, features and advantages of the present invention will be more clearly understood from the following detailed description taken in conjunction with the accompanying drawings, in which:

FIG. 6 is a view showing an example of the zooming position on-screen displaying operation carried out by the on-screen display in accordance with the present invention.

DETAILED DESCRIPTION OF PREFERRED EMBODIMENTS

Figure 1:
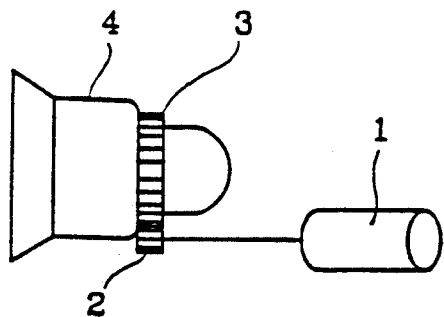
FIG. 1 is a schematic view of a conventional zooming controller for camcorder in accordance with a prior art.
Figure 2:
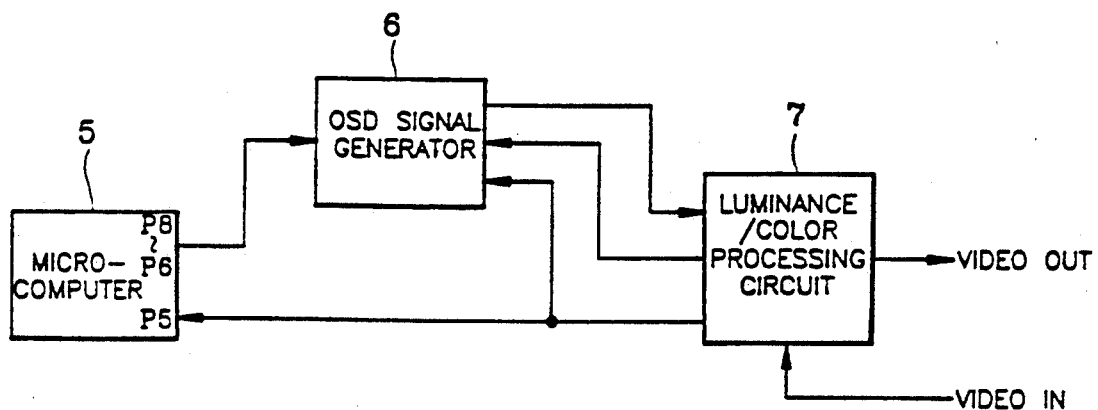
FIG. 2 is a schematic circuit diagram of a conventional on-screen display for camcorder in accordance with the prior art.
Figure 3:
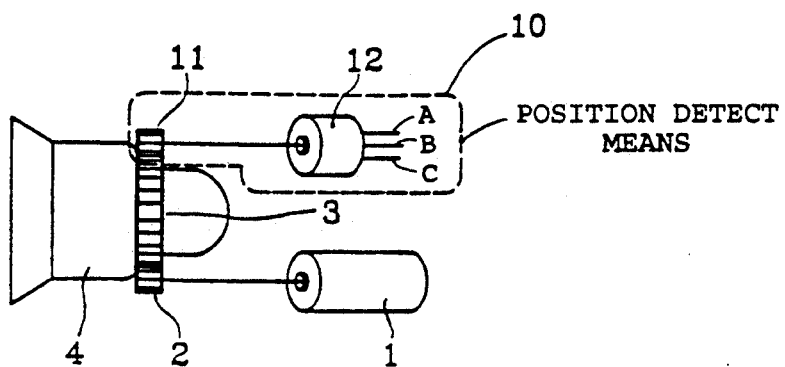
FIG. 3 is a schematic view showing a construction of a zooming position detector device for camcorder in accordance with the present invention.
Figure 4:
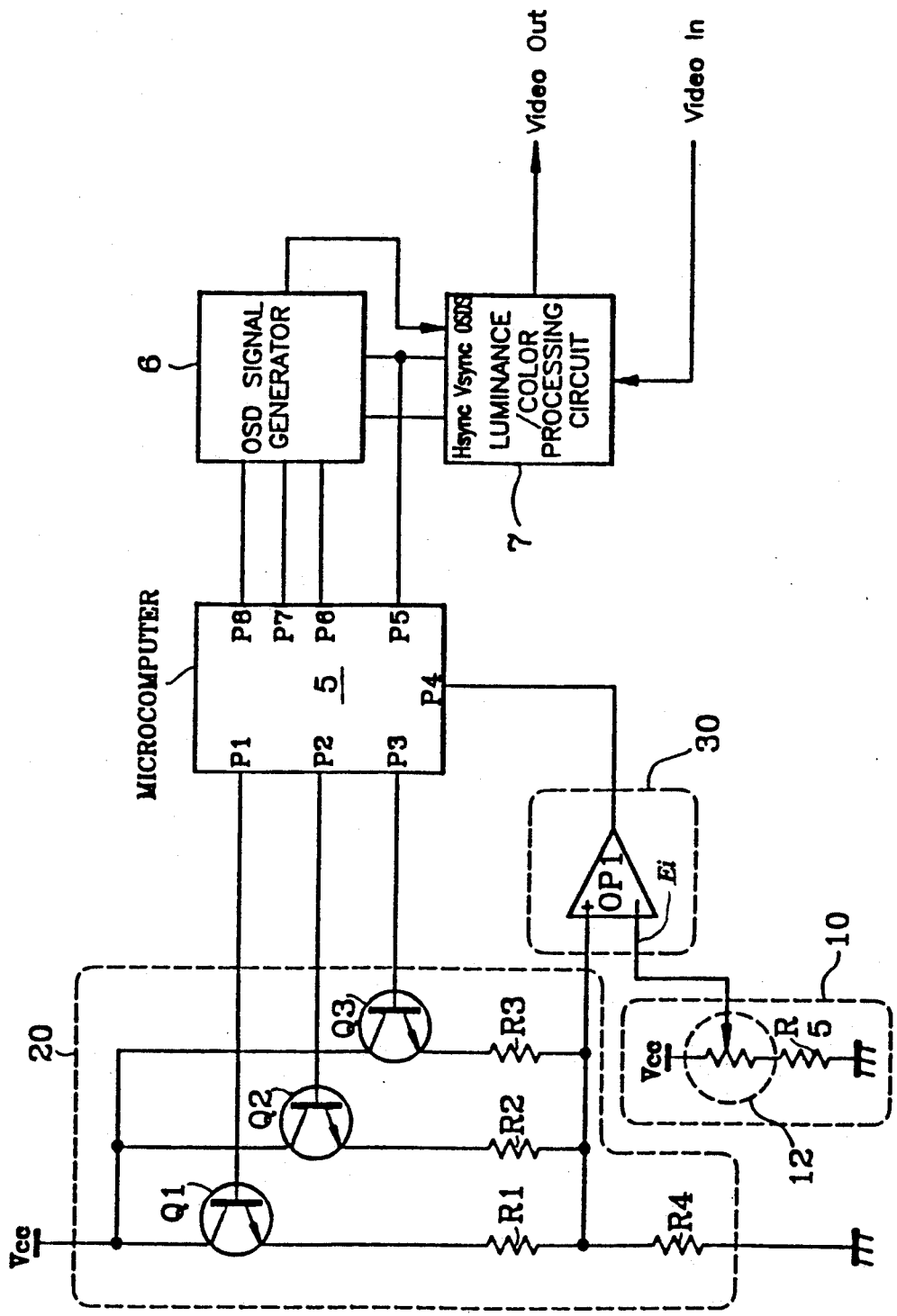
FIG. 4 is a schematic circuit diagram of a zooming position on-screen display device for camcorder in accordance with the present invention.

Turning now to FIG. 3 which is a schematic view showing a construction of a zooming position detector device in accordance with the present invention. Besides a zoom lens 4, a zoom motor 1 adapted for generating the driving power for causing the zoom lens 4 to move in/out, a zoom motor gear 2 for transmitting the driving power, and a zoom gear 3 engaged with the zoom motor gear 2 in order to drive the zoom lens 4, the zooming position detector device according to the present invention further comprises a zooming position detect means 10. The zooming position detect means 10 comprises a variable resistor gear 11 engaged with the zoom gear 3 at the opposite position to the position of the zoom motor gear 2, and a variable resistor 12 of which resistance can be varied depending on the rotation of the variable resistor gear 11. Thus, the zooming position detect means 10 can detect a voltage (Ei) in proportion to the varied resistance corresponding to the present zooming position of the zoom lens 4. FIG. 4 is a schematic circuit diagram of a zooming position on-screen display in accordance with the present invention. Besides a microcomputer 5 adapted for outputting the on-screen display data, an on-screen display character signal generator 6 adapted for generating an on-screen display character signal in accordance with the on-screen display data from the microcomputer 5, and a luminance/color processing circuit 7 adapted for processing a picked up video signal so that it composes the on-screen display character signal (OSD) from the on-screen display signal generator 6 with the processed video signal to output a composite video signal to CRT (not shown), the on-screen display device according to the present invention further comprises the zooming position detect means 10 shown in FIG. 3, a reference voltage variation means 20 and a comparator OP1 30. The reference voltage variation means 20 comprises a plurality of transistors Q1-Q3 of which bases are applied with switching control signals from switching control ports P1-P3 of the microcomputer 5, a plurality of emitter resistors R1-R3 connected respectively to the corresponding emitters of the transistors Q1-Q3, and a ground resistor R4 connected in common to the emitter resistors R1-R3. Thereby, the reference voltage variation means 20 can vary a reference voltage (e) determined by dividing of source voltage (Vcc) between the emitter resistors R1-R3 and the ground resistor R4 in sequence and to predetermined steps, in response to the switching control signals. Also, the comparator OP1 30 has its inverting input terminal (−) applied with the detected voltage Ei for the zooming position from the zooming position detect means 10 and its non-inverting input terminal applied with the reference voltage (e) from the reference voltage variation means 20. Therefore, the comparator OP1 30 compares the detected voltage Ei for the zooming position and the reference voltage (e) and outputs the compared resultant signal when the detected voltage Ei for the present zooming position corresponds to the reference voltage (e) to the microcomputer 5. As a result, the compared resultant signal is an on-screen display level setting control signal, thereby enabling the microcomputer 5 to perform the control of the on-screen display.

Now, operation of the zooming position on-screen display device of the present invention having the construction as above-stated will be described in detail.

As shown in FIG. 3, the variable resistor gear 11 is engaged with the zoom gear 3 in order to mechanically equalize the total range of the number of rotations of the zoom gear 3 with the total variable resistance range of the variable resistor 12, and thus the resistance of the variable resistor 12 can be varied in accordance with the movement of the zooming position.

Therefore, when the zoom motor gear 2 rotates by the driving force from the zoom motor 1, the zoom gear 3 engaged with the zoom motor gear 2 also rotates, resulting in causing the zoom lens 4 to move in/out, and thus the zooming operation of the zoom lens is carried out. At this time, the variable resistor gear 11 engaged with the zoom gear 3 also rotates, so that the resistance of the variable resistor 12 can be varied in accordance with the number of rotations of the variable resistor gear 11.

Accordingly, the resistance of the variable resistor 12 can be varied to correspond to the zooming position of the zoom lens 4 because the range of the in/out movement of the zoom lens 4, that is, the total range of the number of rotations of the zoom lens 4 is mechanically equalized with the total variable resistance range of the variable resistor 12 as above-described.

Thus, as shown in FIG. 4, when the source voltage (Vcc) is applied to the variable resistor 12, the zooming position detect means 10 detects a voltage (Ei) in proportion to the varied resistance corresponding to the zooming position of the zoom lens 4. At this time, the microcomputer 5 outputs switching control signals in sequence at its switching control signal output ports P1-P3 in order to control on/off operations of the transistors Q1-Q3 in the reference voltage variation means 20. By some combinations of the resistors R1-R3 and the ground resistor R4 adapted for dividing the source voltage (Vcc) in accordance with the on/off operations of the transistors Q1-Q3, the reference voltage (e) is determined. Therefore, the reference voltage variation means 20 can vary the reference voltage (e) determined by dividing of source voltage (Vcc) between the emitter resistors R1-R3 and the ground resistor R4 in sequence, in response to the switching control signals from the microcomputer 5. Then, the comparator OP1 30 compares the detected voltage Ei for the zooming position from the zooming position detect means 10 and the reference voltage (e) from the reference voltage variation means 20 and outputs the compared resultant square wave pulse signal when the detected voltage Ei for the present zooming position corresponds to the reference voltage (e) to the microcomputer 5. As a result, the compared resultant signal is an on-screen display level setting control signal, thereby enabling the microcomputer 5 to perform the control of the on-screen display. Namely, the microcomputer 5 detects a timing when the output from the comparator OP1 30 varies, then sets an on-screen display level corresponding to the reference voltage at the detected timing, and thereafter performs the control of the on-screen display in accordance with the established on-screen display level.

Figure 5:
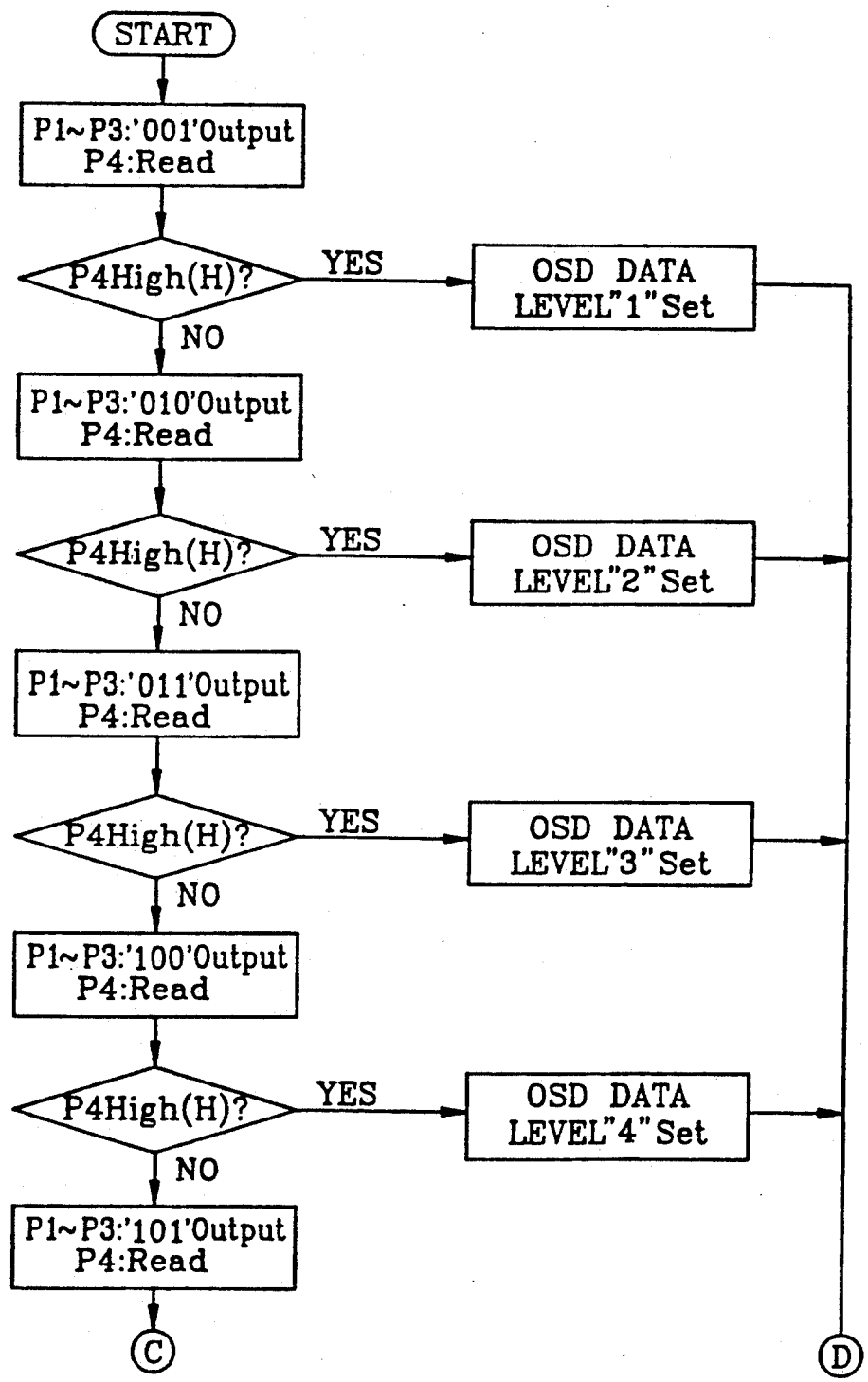
FIG. 5 is a flow chart for showing an on-screen display control for the zooming position by a microcomputer of FIG. 4.

Referring to FIG. 5 which is a flow chart showing an on-screen display control for the zooming position by the microcomputer 5, the microcomputer 5 outputs control signals on predetermined steps in sequence at its switching control signal output ports P1-P3 during the zooming operation of the zoom lens 4, and on the other hand responds to the compared resultant signal level from the comparator OP1 30 inputted through its zooming position sensor port P4, thereby setting the steps of on-screen display levels corresponding to the present zooming position.

That is, as the microcomputer 5 outputs switching control signals of seven step values, "001"–"111", in sequence, it detects when the output signal from the comparator OP1 30 first attains a high level state, then sets the on-screen display data level corresponding to the switching control signal output step to that value. For example, if output signal from the comparator OP1 30 first reaches a high level state when a first step switching control signal "001" is outputted from the microcomputer 5, the on-screen display data level is set to "1". Also, if output signal from the comparator OP1 30 reaches the high level state when the fifth step switching control signal "101" is outputted from the microcomputer 5, the on-screen display data level is set to the value "5". In the same manner, if output signal from the comparator OP1 30 reaches the high level state when a seventh step switching control signal "111" is outputted from the microcomputer 5, the on-screen display data level is set to a seventh step "7". However, if the high level signal from the comparator OP1 30 is not detected even though all the seven switching control signals "001"–"111" have been outputted in sequence from the microcomputer 5, the on-screen display data level is set to an eighth step "8".

Figure 6:
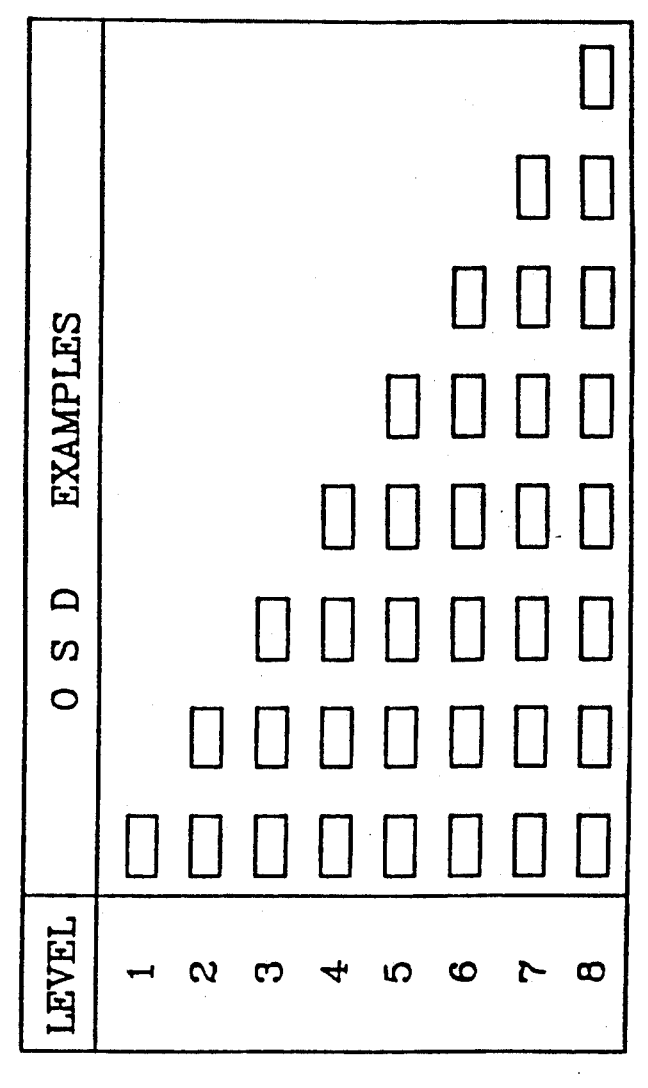

As shown in FIG. 6 which is a view for showing an example of an on-screen display corresponding to on-screen display data levels in accordance with the present invention, if the on-screen display data levels "1"–"8" are set, the on-screen display the set levels are outputted to the on-screen display character signal character signal generator 6, thereby allowing the on-screen displays different from each other depending on the respective step to be displayed on-screen of the CRT.

As described above, the camcorder with the zooming position on-screen display in accordance with the present invention can display the present zooming position on screen. Therefore, the user can accurately observe the present zooming position, thereby allowing the desired sizes, styles and compositions of the pictures to be adjusted accurately. Also, the user can decide whether he continues or stops the pickup at the present pickup position because he can sense the residual zooming range of the zoom lens when the object moves forward or backward, thus he may not miss the important scene and obtain good pictures which are prevented from being shaken and out of composition.

Although the preferred embodiments of the invention have been disclosed for illustrative purpose, those skilled in the art will appropriate that various modifications, additions and substitutions are possible, without departing from the scope and spirit of the invention as disclosed in the accompanying claims.

What is claimed is:

1. An on-screen display device for a camcorder comprising a zoom motor, a zoom motor gear, a zoom gear, a zoom lens, a microcomputer adapted for outputting on-screen display data, an on-screen display character signal generator adapted for generating on-screen display character signals in response to the on-screen display data inputted from the microcomputer, and a luminance/color processing circuit for composing the on-screen display character signals inputted from the on-screen display character signal generator with the video signal and for then outputting composite video signals, further comprising:
    zooming position detector means for detecting a zooming position as a voltage signal that is proportional to a direction and number of rotations of said zoom gear;
    reference voltage variation means for sequentially varying a reference signal in a predetermined manner in response to switching control signals from said microcomputer; and
    comparison means for comparing the reference voltage signal from said reference voltage variation means with the voltage signal from said zooming position detector means, and for outputting the on-screen display level setting control signal corresponding to a present value of said reference voltage when said comparison output signal is at a predetermined level.

2. An on-screen display device for a camcorder as claimed in claim 1, wherein said zooming position detector means comprises a variable resistor, a variable resistor gear engaged with said zoom gear in order to mechanically equalize the total range of rotations of said zoom gear and the total variable resistance range of said variable resistor, resulting in detecting the zooming position in voltage signal corresponding to the variable resistance of said variable resistor.

3. An on-screen display device for a camcorder as claimed in claim 1, wherein said reference voltage variation means comprises a plurality of transistors of which bases are connected to corresponding switching control signal output ports of said microcomputer, collectors are commonly applied with a power voltage, a plurality of emitter resistors are connected to emitters of said transistors, and are also connected to a non-inverting input terminal of said comparison means, and a ground resistor commonly connected to said emitter resistors.

4. An on-screen display device for a camcorder as claimed in claim 1, wherein said microcomputer outputs step switching control output signals at its switching control signal output ports, simultaneously detects a timing when the output from said comparison means varies, thereafter sets up the on-screen level corresponding to the value of the switching control output signal at said timing in order to on-screen display the zooming position.

* * * * *